(12) United States Patent
Iwamoto et al.

(10) Patent No.: US 8,094,203 B2
(45) Date of Patent: Jan. 10, 2012

(54) IMAGING APPARATUS HAVING MOVING IMAGE SHOOTING FUNCTION

(75) Inventors: Kenji Iwamoto, Kokubunjl (JP); Ryuji Takano, Yamagata (JP); Kenzo Sashida, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 1005 days.

(21) Appl. No.: 12/012,180

(22) Filed: Jan. 31, 2008

(65) Prior Publication Data

US 2008/0186387 A1 Aug. 7, 2008

(30) Foreign Application Priority Data

Feb. 2, 2007 (JP) ................................. 2007-024633

(51) Int. Cl.
*H04N 5/235* (2006.01)
(52) U.S. Cl. .................. 348/221.1; 348/362; 348/229.1; 348/230.1; 348/333.05
(58) Field of Classification Search .............. 348/333.05
See application file for complete search history.

(56) References Cited

U.S. PATENT DOCUMENTS

| | | | |
|---|---|---|---|
| 5,557,358 A | 9/1996 | Mukai et al. | |
| 6,204,881 B1 | 3/2001 | Ikeda et al. | |
| 6,871,010 B1 * | 3/2005 | Taguchi et al. | 348/220.1 |
| 7,193,647 B2 * | 3/2007 | Voss et al. | 348/220.1 |
| 2001/0055070 A1 * | 12/2001 | Watanabe | 348/333.05 |
| 2002/0118293 A1 | 8/2002 | Hori et al. | |
| 2003/0206241 A1 * | 11/2003 | Serizawa et al. | 348/362 |
| 2005/0057678 A1 | 3/2005 | Fujii | |
| 2005/0083414 A1 | 4/2005 | Hidaka et al. | |
| 2006/0007341 A1 | 1/2006 | Nakamura et al. | |
| 2006/0012690 A1 | 1/2006 | Nakamura et al. | |
| 2006/0203109 A1 | 9/2006 | Ono | |
| 2007/0279498 A1 | 12/2007 | Nonaka | |
| 2009/0109323 A1 | 4/2009 | Muraki et al. | |
| 2009/0207278 A1 | 8/2009 | Muraki et al. | |

FOREIGN PATENT DOCUMENTS

| | | |
|---|---|---|
| JP | 2004-064467 A | 2/2004 |
| JP | 2004-200950 A | 7/2004 |
| JP | 2005-519534 T | 6/2005 |

(Continued)

OTHER PUBLICATIONS

Related U.S. Appl. No. 12/257,622, Inventor: Muraki, Jun, et al; filed Oct. 24, 2008; Title: "Image Pick-Up Apparatus, Image Playback Apparatus, Method of Controlling a Recording Operation, Method of Controlling a Displaying Operation, and Recording Medium".

(Continued)

*Primary Examiner* — Anthony J Daniels
(74) *Attorney, Agent, or Firm* — Holtz, Holtz, Goodman & Chick, PC

(57) ABSTRACT

In a digital camera (1), when a plurality of EV shift values are selected and operation of a set key is performed by a user, a CPU calculates shutter speeds that respectively correspond to the selected EV shift values (S6). Next, the CPU repeatedly picks up images in sequence at the individual calculated shutter speeds, sorts the picked-up frame image data by shutter speed, and generates moving image data for individual shutter speeds. Then, the CPU multiple-displays the generated moving image data for each shutter speed as through images (S9), and records the generated moving image data for each shutter speed (S17).

12 Claims, 8 Drawing Sheets

FOREIGN PATENT DOCUMENTS

| | | |
|---|---|---|
| JP | 2005-260662 A | 9/2005 |
| JP | 2006-005681 A | 5/2006 |
| JP | 2007-060449 A | 3/2007 |
| JP | 2007-251611 A | 9/2007 |
| JP | 2007-259156 A | 10/2007 |

OTHER PUBLICATIONS

Related U.S. Appl. No. 12/369,887; Inventor: Muraki, Jun, et al; filed Feb. 12, 2009; Title: "Image Pick-Up Apparatus, Image Data Processing Apparatus, and Recording Medium".

* cited by examiner

IMAGING APPARATUS HAVING MOVING IMAGE SHOOTING FUNCTION

CROSS-REFERENCE TO RELATED APPLICATION

This application is based upon and claims the benefit of priority from the prior Japanese Patent Application No. 2007-024633, filed Feb. 2, 2007, the entire contents of which is incorporated herein by reference.

BACKGROUND OF THE INVENTION

1. Field of the Invention

The present invention relates to an imaging apparatus and an imaging method that can be used for a digital camera having a moving image shooting function.

2. Description of the Related Art

In an imaging apparatus, a plurality of moving image data of different shooting conditions are acquired from moving image data that have been picked up. As a method for this purpose, conventionally, there is an art of generating a plurality of moving image data with different angles of view from picked-up individual moving image data through performance of digital zoom processing so that the angles of view are different, and multiple-displaying the plurality of generated moving image data (for example, refer to Japanese Laid-Open (Kokai) Patent Publication No. 2004-200950).

SUMMARY OF THE INVENTION

The present invention has been conceived in light of the foregoing situations, and is to provide an imaging apparatus and an imaging method that acquires a plurality of moving images under different shooting conditions without using image processing or image processing.

In accordance with one aspect of the present invention, there is provided an imaging apparatus comprising: an imaging section for imaging a subject; a first imaging controlling section for controlling the imaging section to perform imaging in a first exposure condition; a second imaging controlling section for controlling the imaging section to repeatedly perform imaging in a second exposure condition that is different from the first exposure condition such that the imaging in the second exposure condition repeatedly interposes (repeatedly interrupts) the imaging in the first exposure condition which is repeatedly performed by the first imaging controlling section; a first generation section for generating a first moving image data based on a plurality of frame image data acquired by repeated imaging performed by the first imaging controlling section; and a second generation section for generating a second moving image data based on a plurality of frame image data acquired by repeated imaging performed by the second imaging controlling section.

In accordance with another aspect of the present invention, there is provided an imaging method comprising: a first imaging controlling step for controlling an imaging section to repeatedly perform imaging in a first exposure condition; a second imaging controlling step for controlling the imaging section to repeatedly perform imaging in a second exposure condition that is different from the first exposure condition such that the imaging in the second exposure condition repeatedly interposes (repeatedly interrupts) the imaging in the first exposure condition which is repeatedly performed by the first imaging controlling step; a first generation step for generating a first moving image data based on a plurality of frame image data acquired by repeated imaging performed by the first imaging controlling step; and a second generation step for generating a second moving image data based on a plurality of frame image data acquired by repeated imaging performed by the second imaging controlling step.

In accordance with another aspect of the present invention, there is provided a computer-readable storage medium having a program for an imaging apparatus stored thereon that is executable by a computer, comprising: a first imaging controlling process for controlling an imaging section to repeatedly perform imaging in a first exposure condition; a second imaging controlling process for controlling the imaging section to repeatedly perform imaging in a second exposure condition that is different from the first exposure condition such that the imaging in the second exposure condition repeatedly interposes (repeatedly interrupts) the imaging in the first exposure condition which is repeatedly performed by the first imaging controlling process; a first generation process for generating a first moving image data based on a plurality of frame image data acquired by repeated imaging performed by the first imaging controlling process; and a second generation process for generating a second moving image data based on a plurality of frame image data acquired by repeated imaging performed by the second imaging controlling process.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The present invention will hereinafter be described in detail with reference to the preferred embodiments shown in the accompanying drawings as an example of application of the image apparatus of the present invention to a digital camera.

Embodiment

A. Configuration of the Digital Camera

Figure 1:
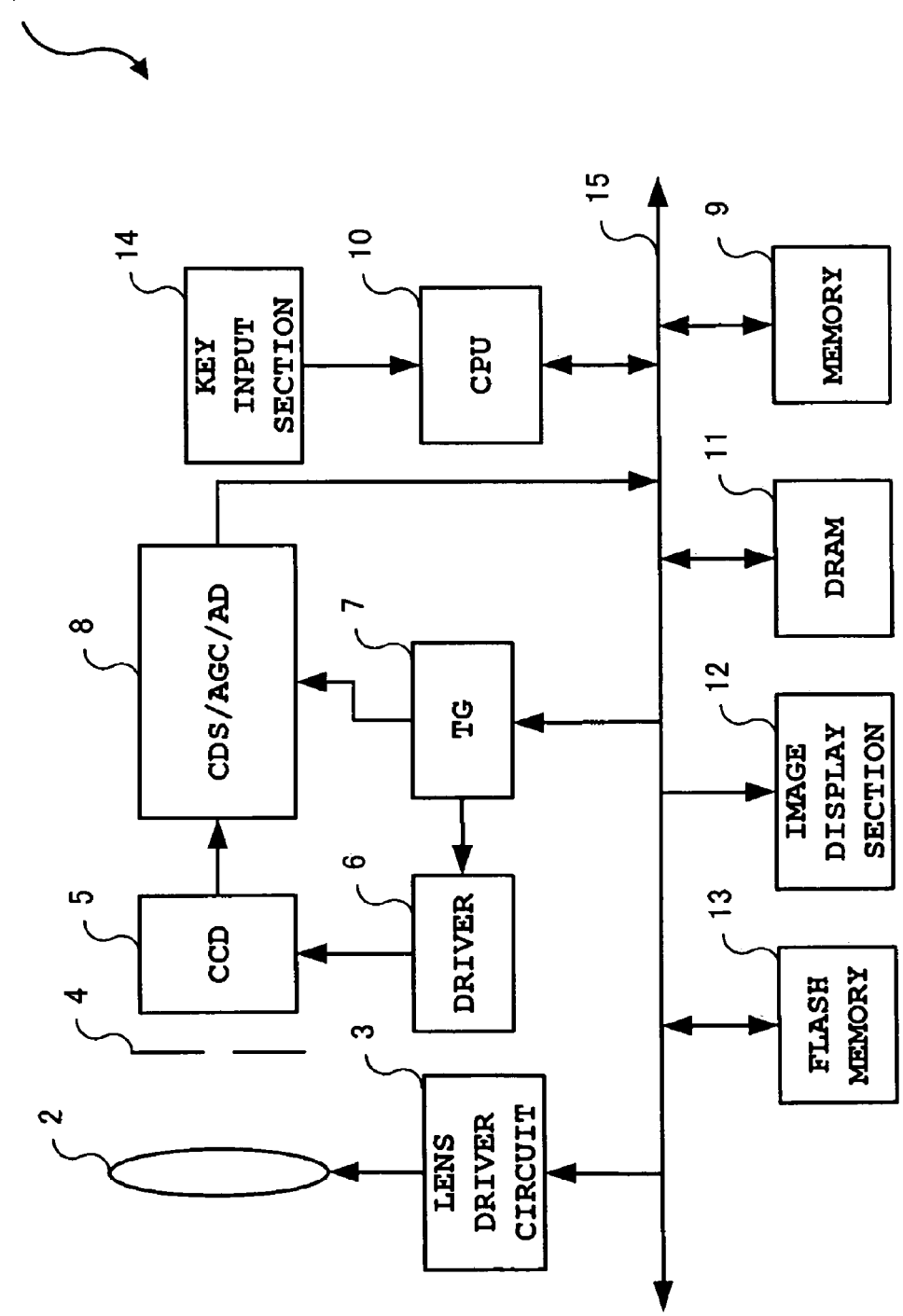
FIG. 1 is a block diagram of a digital camera according to an embodiment of the present invention.

FIG. 1 is a block diagram of an electrical schematic of a digital camera 1 according to the present embodiment.

The digital camera 1 includes an imaging lens 2, a lens driver circuit 3, an aperture 4, a charge-coupled device (CCD) 5, a driver 6, a timing generator (TG) 7, a unit circuit 8, a memory 9, a central processing unit (CPU) 10, a dynamic random access memory (DRAM) 11, an image display section 12, a flash memory 13, a key input section 14 and a bus 15.

The imaging lens 2 includes a focus lens, a zoom lens and the like, each of which includes a plurality of lens groups, and the imaging lens 2 is connected to the lens driver circuit 3.

The lens driver circuit 3 includes a focus motor and a zoom motor that respectively drive the focus lens and the zoom lens in the optical axis direction, and a focus motor driver and a zoom motor driver (not shown) that respectively drive the focus motor and the zoom motor in adherence to a control signal sent from the CPU 10.

The aperture 4 includes a driver circuit and the driver circuit operates the aperture 4 in adherence to a control signal sent from the CPU 10.

The aperture refers to a mechanism that controls an amount of light that is incident from the imaging lens 2.

The imaging element (CCD 5) is driven by the driver 6. The CCD 5 photo-electrically converts the light intensity of the respective colors in the RGB value of a subject image at a constant cycle and outputs the light intensity to the unit circuit 8 as an imaging signal. The operation timings of this driver 6 and unit circuit 8 are controlled by the CPU 10, via the TG 7. Note that the CCD 5 has color filters in the Bayer arrangement, and also has a function of an electronic shutter. A shutter speed (exposure time) of this electronic shutter is controlled by the CPU 10, via the driver 6 and the TG 7.

The TG 7 is connected to the unit circuit 8. The unit circuit 8 includes a correlated double sampling (CDS) circuit, an automatic gain control (AGC) circuit, and an analog-to-digital (A/D) converter. The CDS circuit performs correlated double sampling on the imaging signal outputted from the CCD 5 and holds the sampled imaging signal. The AGC circuit performs automatic gain control on the sampled imaging signal. The A/D converter converts the automatic-gain-controlled analog imaging signal to a digital signal. The imaging signal outputted from the CCD 5 is sent to the CPU 10 as the digital signal, via the unit circuit 8.

The CPU 10 is a one-chip microcomputer that controls each section of the digital camera 1, having functions that perform image processing such as gamma correction processing, interpolation processing, white balance processing, histogram generation processing, luminosity color-difference signal (YUV data) generation processing and the like on the image data sent from the unit circuit 8, and functions that perform compression and expansion processing (compression and expansion in a joint photographic experts group (JPEG) format or a moving picture experts group (MPEG) format, etc.) on the image data and imaging processing.

Particularly, in the present embodiment, the CPU 10 has at least following functions: the function of acquiring a plurality of different shooting conditions (such as shutter speeds) (acquisition section); the function of performing imaging a plurality of times in the acquired individual shooting conditions using the imaging element, and of performing, while imaging in a certain acquired shooting condition a plurality of times, consecutive imaging that contains imaging in all acquired shooting conditions by applying an imaging operation that interposes imaging in the other acquired shooting conditions to a plurality of imaging in all acquired shooting conditions (first consecutive imaging controlling section); and the function of generating moving image data for the individual shooting conditions based on the consecutively picked-up frame image data (generation section).

The functions of the CPU 10 are summarized as follows. The CPU 10 realizes the functions of a first imaging controlling section, a second imaging controlling section, a third imaging controlling section, a fourth imaging controlling section, a first generation section, a second generation section, a third generation section, a fourth generation section, a display controlling section, a selection section, a recording controlling section, a consecutive still image imaging controlling section, a moving image imaging controlling section, and a still image imaging controlling section.

The memory 9 stores a control program required to control each section of the CPU 10 and necessary data, and the CPU 10 operates in accordance with the program.

The DRAM 11 is used as a buffer memory for temporarily storing the image data that has been picked up by the CCD 5 and sent to the CPU 10, and also used as a working memory of the CPU 10.

The image display section 12 includes a color liquid crystal display (LCD) and a driver circuit for the color LCD. In stand-by mode, the image display section 12 displays the subject picked up by the CCD 5 as a through image. When playing back a recorded image, the image display section 12 displays the recorded image that has been read out from the flash memory 13 and expanded.

The flash memory 13 is a recording medium that is used to store the image data picked up by the CCD4 and related information.

The DRAM that functions as the buffer memory 11 and the flash memory 13 realize the function of a recording section.

The key input section 14 includes a plurality of operation keys, such as, a shutter button (shooting instruction section), a video-recording button (shooting instruction section), a mode selection key, an EV shift key, a cancellation key, a cross key, a SET key, and the like, and outputs operational signals that correspond to the key operations performed by the user to the CPU 10. The cross key and the SET key realize the function of the selection section, and the key input section 14 and the CPU 10 realize the function of the setting section.

B. Operations of the Digital Camera 1

An operation performed by the digital camera 1 according to the embodiment will be described with reference to the flowchart in FIG. 2.

When a mode is set to a shooting mode by user operation of the mode selection key in the key input section 14, the CPU 10 controls the CCD 5 to start processing of imaging a subject at a predetermined frame rate (herein, at the frame rate of 30 fps), and generates a frame image data in the luminosity color-difference signal from the consecutively picked-up frame images. Then, the CPU 10 stores the generated frame image data in the luminosity color-difference signal in the buffer memory (DRAM 11), and starts a so-called through image display (Step S1) in which the CPU 10 displays the consecutively stored image data in the image display section 12 (Step S1).

At this time, the CPU 10 calculates a value of an appropriate exposure amount EV based on the picked-up frame image data, and sets a shutter speed of the electronic shutter, an aperture value of the aperture 4 and a sensitivity (sets a gain amount of the unit circuit 8 and a number of pixels to add in pixel addition driving of the CCD 5) so as to achieve the calculated value of the appropriate exposure amount EV.

Then the CPU 10 acquires an image data of the subject so as to achieve the shutter speed, the aperture value, and the sensitivity that have been set.

The sensitivity relates to brightness of the image. The sensitivity can be changed depending on the AGC gain value of the unit circuit 8 and/or the number of pixels to be added by the pixel addition driving.

In this case, the shutter speed set based on the value of the appropriate exposure amount EV is 1/125 (s(second)).

Next, at Step S2, the CPU 10 judges whether operation of the EV shift key has been performed. This judgment is made based on whether an operational signal corresponding to operation of the EV shift key has been sent from the key input section 14.

When judged at Step S2 that operation of the EV shift key has not been performed, the CPU 10 moves to other processing. On the other hand, when judged that operation of the EV shift key has been performed, the CPU 10 proceeds to Step S3, and judges whether the EV shift value (EV corrected value) has been selected. A plurality of EV shift values can be selected, and in this case, up to four EV shift values can be selected.

When judged at Step S2 that operation of the EV shift key has been performed, the CPU 10 displays a plurality of the EV shift values. For example, the CPU 10 shows a list of a plurality of the EV shift values such as "EV shift: +0.7", "EV shift: +6", "EV shift: 0", "EV shift: −0.7". Accordingly, the EV shift values can be selected by user operation of the cross key and the SET key. As a result, a plurality of possible EV shift values that the user wants to use during shooting can be selected.

In addition, the EV shift values such as "+0.7", "+0.3" indicate to what degree the exposure is corrected. The EV shift value "0" indicates that exposure is not corrected, that is, the EV value "0" is the appropriate exposure amount as described above. The larger the absolute value is in the positive direction (+1 to +0.3 to +0.7), the larger the exposure amount will be compared to the appropriate exposure amount, that is, the brighter the image will be. On the other hand, the larger the absolute value is in the negative direction (−0.1 to −0.3 to −0.7), the smaller the exposure amount will be compared to the exposure amount, that is, the darker the image will be.

When judged at Step S3 that selection of the EV shift values has been performed, the CPU 10 proceeds to Step S4, and stores the selected EV shift values in an EV shift information memory area of the buffer memory.

Next, at Step S5, the CPU 10 judges whether the operation of the SET key has been performed. This judgment is made based on whether an operational signal corresponding to operation of the SET key has been sent from the key input section 14.

When the CPU 10 judges at Step S5 that operation of the SET key has not been performed, the CPU 10 returns to Step S3, and from which the CPU 10 can repeat the operation as described above. In other words, selection of the EV shift values can be changed until operation of the SET key is performed. When selection of the EV shift values is changed, memory in the EV shift information memory area will be updated in accordance with this change.

On the other hand, when judged at Step S5 that operation of the SET key has been performed, the CPU 10 determines the EV shift values that are currently selected (the EV shift values that are stored in the EV shift information memory area) as the corrected values, and proceeds to Step S6. At Step S6, the CPU 10 calculates shutter speeds that respectively correspond to EV values that are obtained by adding the determined EV shift values (the EV shift values stored in the EV shift information memory area) to the value of the appropriate exposure amount EV, and stores the calculated shutter speeds in the shutter speed memory area of the buffer memory (acquisition section). At this time, the CPU 10 also stores the information indicating which EV shift values the calculated shutter speed correspond to, respectively.

In this case, the CPU 10 corrects a value such that the larger the EV shift value is, the brighter the image will be, and the smaller the EV shift value is, the darker the image will be. Accordingly, the CPU 10 makes the image brighter by decreasing the shutter speed as the EV shift value increases, and darker by increasing the shutter speed as the EV shift value decreases.

Assume that the EV shift values that are stored in the EV shift information memory area when operation of the SET key is performed (i.e., the EV shift values that are determined as the corrected values) are "EV shift: +0.7", "EV shift: +0.3", "EV shift: 0" and "EV shift: −0.3". In the case of "EV shift: 0" (reference EV shift value), the exposure amount is not corrected, and thus the shutter speed corresponding to "EV shift: 0" is the shutter speed that has been set based on the value of the appropriate exposure amount EV as described above (the shutter speed for which no correction is made), that is, 1/125 (s). The shutter speed that is calculated corresponding to "EV shift: +0.3" is 1/60 (s), which is slower than the shutter speed 1/125 (s) for which no correction is made. In addition, the shutter speed that is calculated corresponding to "EV shift: +0.7" is 1/30 (s), which is further slower.

On the other hand, the shutter speed that is calculated corresponding to "EV shift: −0.3" is 1/250 (s), which is faster than the shutter speed for which no correction is made, that is, 1/125 (s).

As described above, the larger the EV shift value becomes compared to the reference EV shift value, the lower the shutter speed will be compared to the shutter speed for which no correction is made. On the other hand, the smaller the EV shift value becomes compared to the reference EV shift value, the higher the shutter speed will be.

In this case, images of the subject are picked up at a predetermined frame rate (30 fps). Therefore, the individual shutter speeds should be calculated such that the calculated shutter speeds are 1/30 (s) or less.

Figure 2:
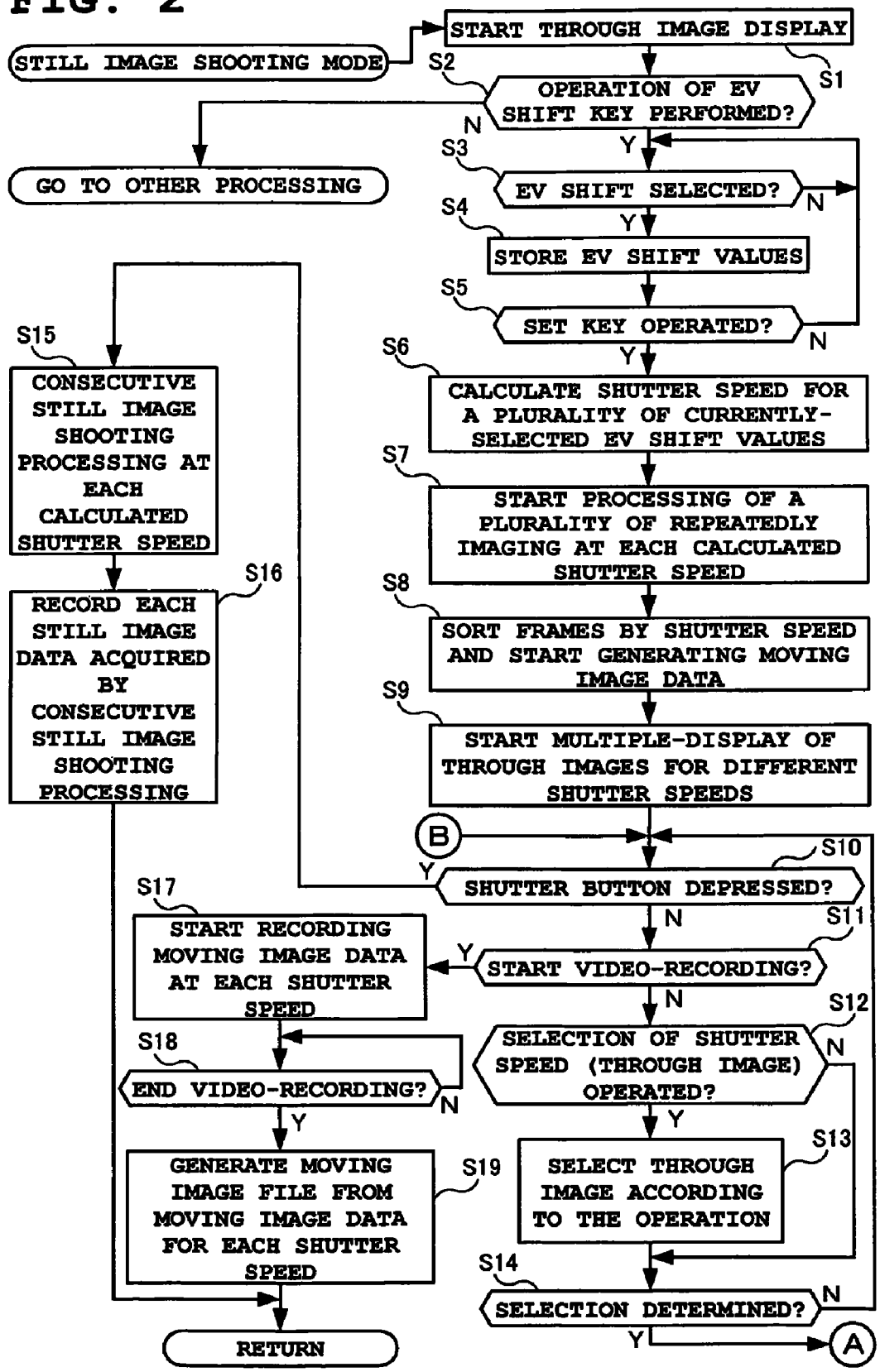
FIG. 2 is a flowchart of an operation performed by a digital camera 1 according to the embodiment.

Referring back to the flowchart in FIG. 2, after calculating the respective shutter speeds corresponding to the plurality of EV shift values that are currently selected, the CPU 10 proceeds to Step S7. At Step S7, the CPU 10 starts processing of repeatedly imaging the subject at the calculated shutter speeds (first consecutive imaging controlling section). In this case, images are picked up in the descending order of the determined EV shift values at the shutter speed corresponding thereto.

For example, the determined EV shift values are "EV shift: +0.7", "EV-shift: +0.3", "EV shift: 0" and "EV shift: −0.3". Therefore, images should be picked up at the shutter speeds in the following order: the first shutter speed is 1/30 (s) corresponding to "EV shift: +0.7", the second shutter speed is 1/60 (s) corresponding to "EV shift: +0.3", the third shutter speed is 1/125 (s) corresponding to "EV shift: 0" and the fourth shutter speed is 1/250 (s) corresponding to "EV shift: −0.3". That is, the frame image data of the subject is picked up in the order of following sequence, at the first shutter speed→at the second shutter speed→at the third shutter speed→at the fourth shutter speed→at the first shutter speed.

Figure 4:
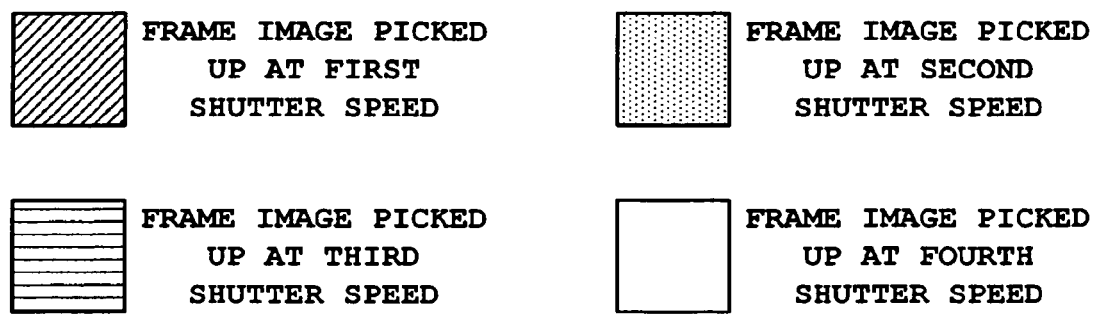
FIG. 4 is a diagram showing shutter speeds for frame image data which are picked up at Step S7.
Figure 4:
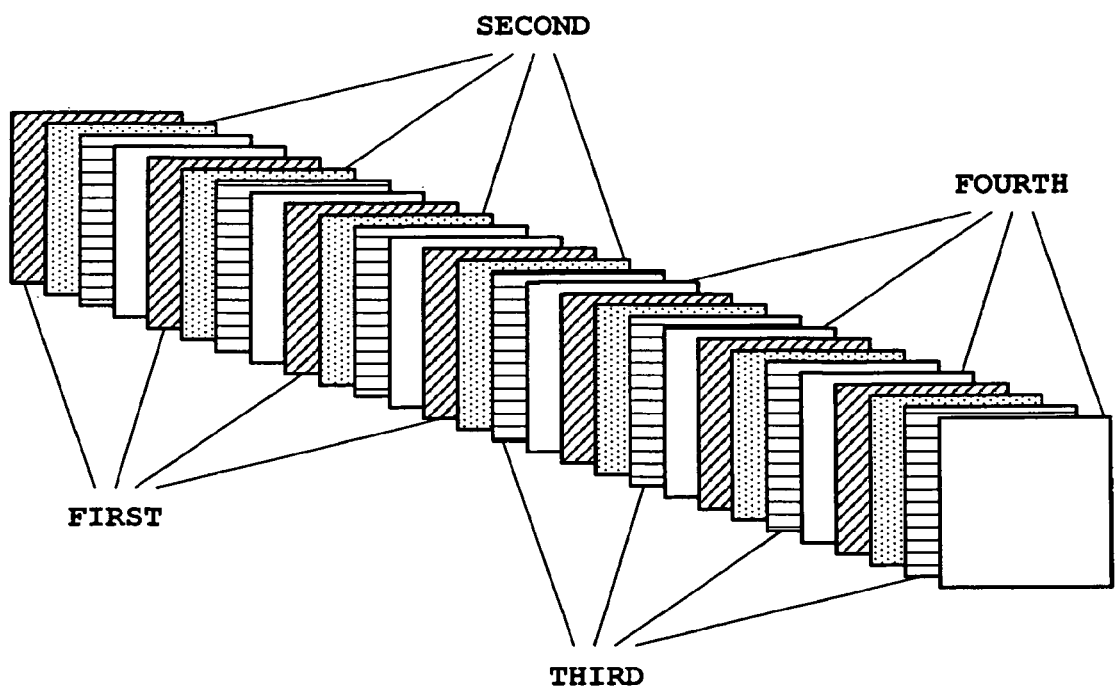

FIG. 4 is a diagram showing shutter speeds for the frame image data that are picked up at Step S7, and from which it is apparent that the images of the subject are picked up repeatedly in sequence at the individual calculated shutter speeds.

After starting processing of repeatedly picking up images at the calculated shutter speeds, the CPU 10 proceeds to Step S8, and starts processing of sorting the picked-up frame image data by shutter speed so as to generate a moving image data (generation section). In the generation of the moving image data, first of all, the CPU 10 provides the same number of areas as the number of the calculated shutter speeds in the buffer memory. In this case, since four EV shift values have been selected and determined, the number of the shutter speeds should be four, and thus the CPU 10 provides four memory areas. Then, the CPU 10 sorts the picked-up frame image data by shutter speed so as to generate the moving image data for individual shutter speeds, and stores them in the individual memory areas.

Figure 5:
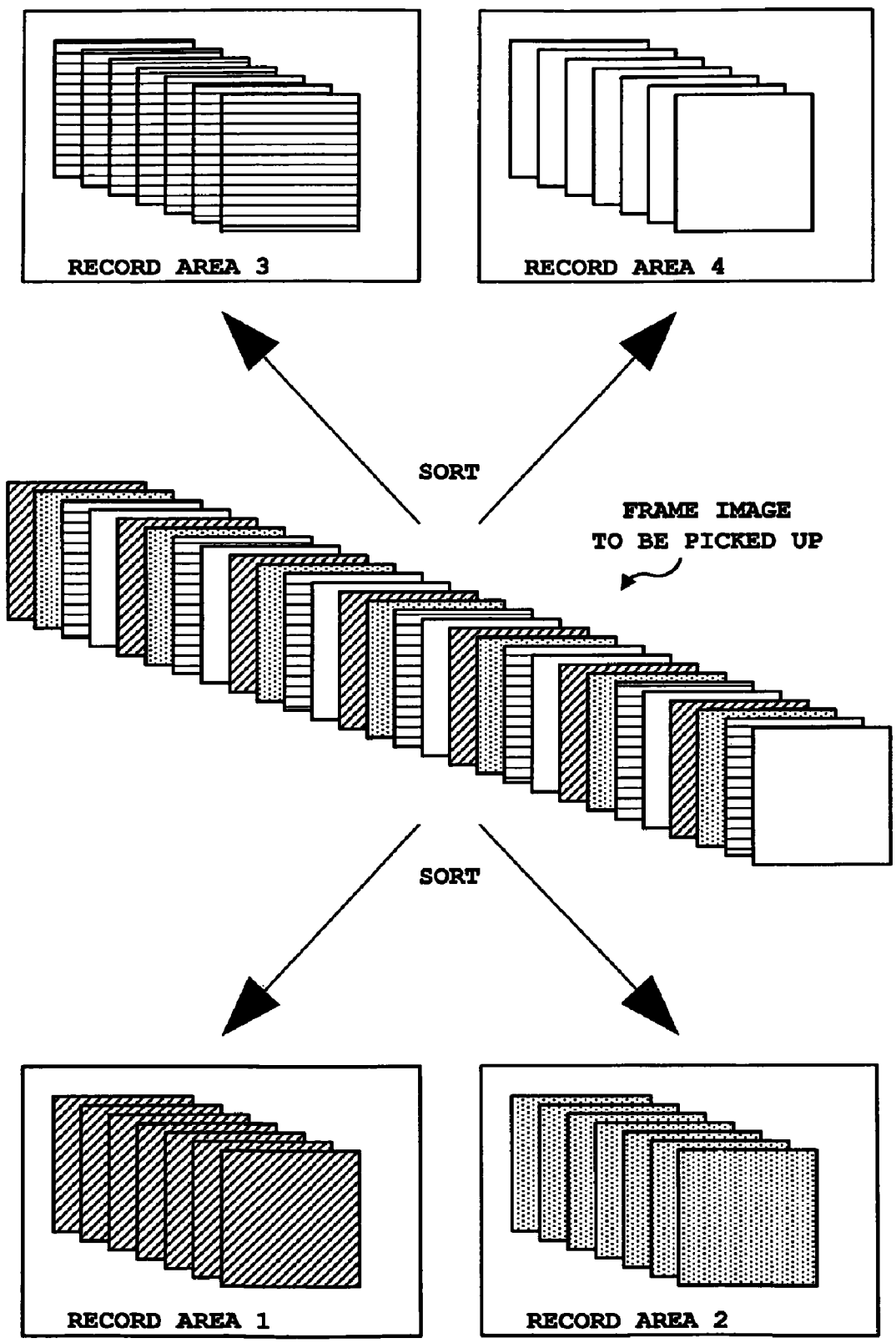
FIG. 5 is a diagram showing a state of sorting the frame image data by shutter speed and storing them.

FIG. 5 is a diagram showing a state in which the CPU 10 sorts the frame image data by shutter speed and stores them. The CPU 10 stores the frame image data picked up at the first shutter speed in a memory area 1 of the buffer memory, the frame image data picked up at the second shutter speed in a memory area 2, the frame image data picked up at the third shutter speed in a memory area 3, and the frame image data picked up at the fourth shutter speed in a memory area 4.

As a result, a plurality of moving image data for different shutter speeds can be acquired concurrently.

Note that instead of providing the memory areas for individual shutter speeds, the CPU 10 can store the picked-up frame image data in a single memory area so as to generate the moving image data for the individual shutter speeds.

Next, at Step S9, the CPU 10 multiple-displays the plurality of generated moving image data for different shutter speeds in the image display section 12 as through images (display controlling section).

Figure 6:
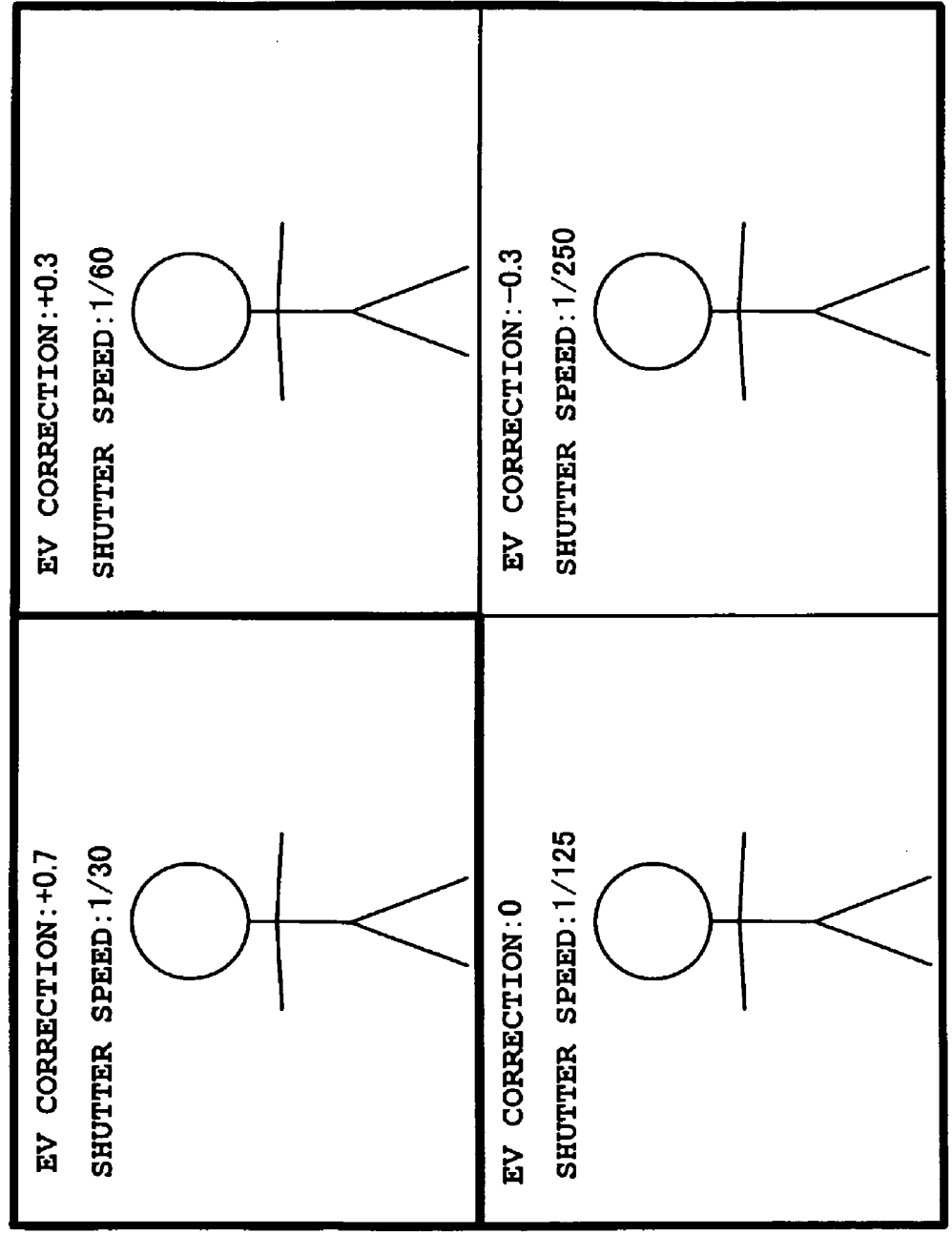
FIG. 6 is a diagram showing a state of multiple-displaying a plurality of through images at different shutter speeds.

FIG. 6 is a diagram showing a state of multiple-displaying a plurality of through images for different shutter speeds. As apparent from FIG. 6, the through images for the individual shutter speeds are displayed. At this time, the CPU 10 displays the EV shift values and the shutter speeds (speeds) in the through images in a superposed manner so that the user realizes which EV shift values and which shutter speeds the through images correspond to by seeing the display.

As a result, the user can compare the plurality of EV shift values (shutter speeds) selected as possible values while recognizing the subject in real time, and can select the optimum or desired EV shift value (shutter speed). In addition, since the CPU 10 displays the moving image data for different shutter speeds in the same size, the user can fairly compare the individual moving image data in the same condition, and can select the shutter speed the user desires. In addition, the CPU 10 picks up repeatedly in sequence at the individual calculated shutter speeds, and therefore the user can make the number of images picked up (frame rate) at the individual shutter speeds equal. As a result, the user can compare the individual moving image data under the same condition fairly, and select the shutter speed the user desires.

When starting multiple-display, the user selects an arbitrary shutter speed, in this case, (the through image for) the first shutter speed, and displays (the through image picked up at) the selected shutter speed so that it is differentiated from (the through images picked up at) the other shutter speeds.

Referring to FIG. 6, it is apparent that the through image for the first shutter speed (the shutter speed 1/30 (s)) is displayed with the thick frame, and therefore is differentiated from the other through images.

Next, the CPU 10 proceeds to Step S10, and judges whether the shutter button has been depressed. This judgment is made based on whether an operational signal corresponding to depression of the shutter button has been sent from the key input section 14. As a result, the user can instruct shooting timing of a still image.

When judged at Step S10 that the shutter button has not been depressed, the CPU 10 proceeds to Step S11, and judges whether or not to start video-recording. This judgment is made based on whether an operational signal corresponding to depression of the recording button has been sent from the key input section 14. As a result, the user can instruct shooting timing of a moving image.

When judged at Step S11 not to start video-recording, the CPU 10 proceeds to Step S12, where the CPU 10 judges whether selection operation of the shutter speed (through image) has been performed. This judgment is made based on whether an operational signal corresponding to operation of the cross key has been sent from the key input section 14.

When judged at Step S12 that selection operation of the shutter speed has been performed, the CPU 10 proceeds to Step S13, where the CPU 10 selects the shutter speed (through image) according to the selection operation, and proceeds to Step S14. At this time, the CPU 10 displays the through image for the shutter speed that has been newly selected such that the through image is differentiated from the other through images.

For example, when the user performs operation of the "→" key of the cross key in the state as shown in FIG. 6 (that is, in the state where the shutter speed 1/30 (s) is selected), the CPU 10 selects the through image for the shutter speed 1/60 (s) and displays the selected through image with the thick frame. In the similar manner, when the user performs operation of the "↓" key of the cross key in the state as shown in FIG. 6, the CPU 10 selects the through image for the shutter speed 1/125 (s), and displays the selected through image with the thick frame.

As a result, the user can select the shutter speed at which the user wants to shoot by viewing the multiple-displayed though images.

On the other hand, when judged at Step S12 that selection operation of the shutter speed has not been performed, the CPU 10 proceeds to Step S14 without executing any processing.

At Step S14, the CPU 10 judges whether to determine the selection of the shutter speed.

In this case, the user selects the shutter speed through operation of the cross key. If the user wants to determine the selection of the shutter speed that is currently selected (if the user wants to shoot at the shutter speed that is currently selected), the user can determine the selection through operation of the SET key. When judged that the operational signal corresponding to operation of the SET key has been sent from the key input section 14, the CPU 10 judges to determine the selection. This cross key and SET key function as the selection section.

As a result, the CPU 10 can determine the selection of the shutter speed the user desires.

When the CPU 10 judges at Step S14 not to determine the selection of the shutter speed, the CPU 10 returns to Step S10, where it repeats the operations as described above.

In this case, when judged at Step S10 that the shutter button has been depressed, the CPU 10 proceeds to Step S15, and performs consecutive still image shooting processing (consecutive still image imaging controlling section) of consecutively shooting images once at each shutter speed calculated at Step S6 (that is, at each shutter speed stored in the shutter speed memory area). Specifically, the CPU 10 shoots at the first shutter speed, subsequently shoots at the second shutter speed, and shoots at the third and fourth shutter speeds. As a result, a single piece of the image data shot at each shutter speed can be obtained.

Next, at Step S16, the CPU 10 compresses the individual still image data acquired by the consecutive shooting processing, and generates still image files respectively, then records them in the flash memory 13 (recording controlling section).

In other words, if the shutter button is depressed before selection of the shutter speed is determined, which will be described later, it is considered to be difficult to determine which of the selected plurality of EV shifts (shutter speeds) is better, and therefore the CPU 10 shoots the still images at the individual shutter speeds.

In the meantime, when judged at Step S11 to start video-recording, the CPU 10 proceeds to Step S17. At Step S17, after video-recording is started, the CPU 10 starts processing of recording the picked-up and generated moving image data for the individual shutter speeds (recording controlling section). Specifically, after video-recording is started, the picked-up frame image data is sorted by shutter speed and stored in the buffer memory as shown in FIG. 5 (that is, the CPU 10 generates the moving image data for each shutter speed and stores them). Next, the CPU 10 stores the sorted and stored individual moving image data in the flash memory 13.

In other words, if the recording button is depressed before selection of the shutter speed, which will be described later, is determined, it is considered to be difficult to determine which of the selected plurality of EV shifts (shutter speeds) is better, and therefore, the CPU 10 records the moving image data for the individual shutter speeds after the recording button is depressed.

As a result, the moving image data for the individual shutter speeds that provide equal image quality can be acquired.

Next, at Step S18, the CPU 10 judges whether to end video-recording. This judgment is made based on whether the operational signal corresponding to depression of the recording button has been sent from the key input section 14 again.

When judged at Step S18 not to end video-recording, the CPU 10 remains at Step S18 until it judges to end video-recording. When judged to end video-recording, the CPU 10 proceeds to Step S19, where the CPU 10 generates moving image files from the recorded moving image data picked up at each shutter speed.

Figure 3:
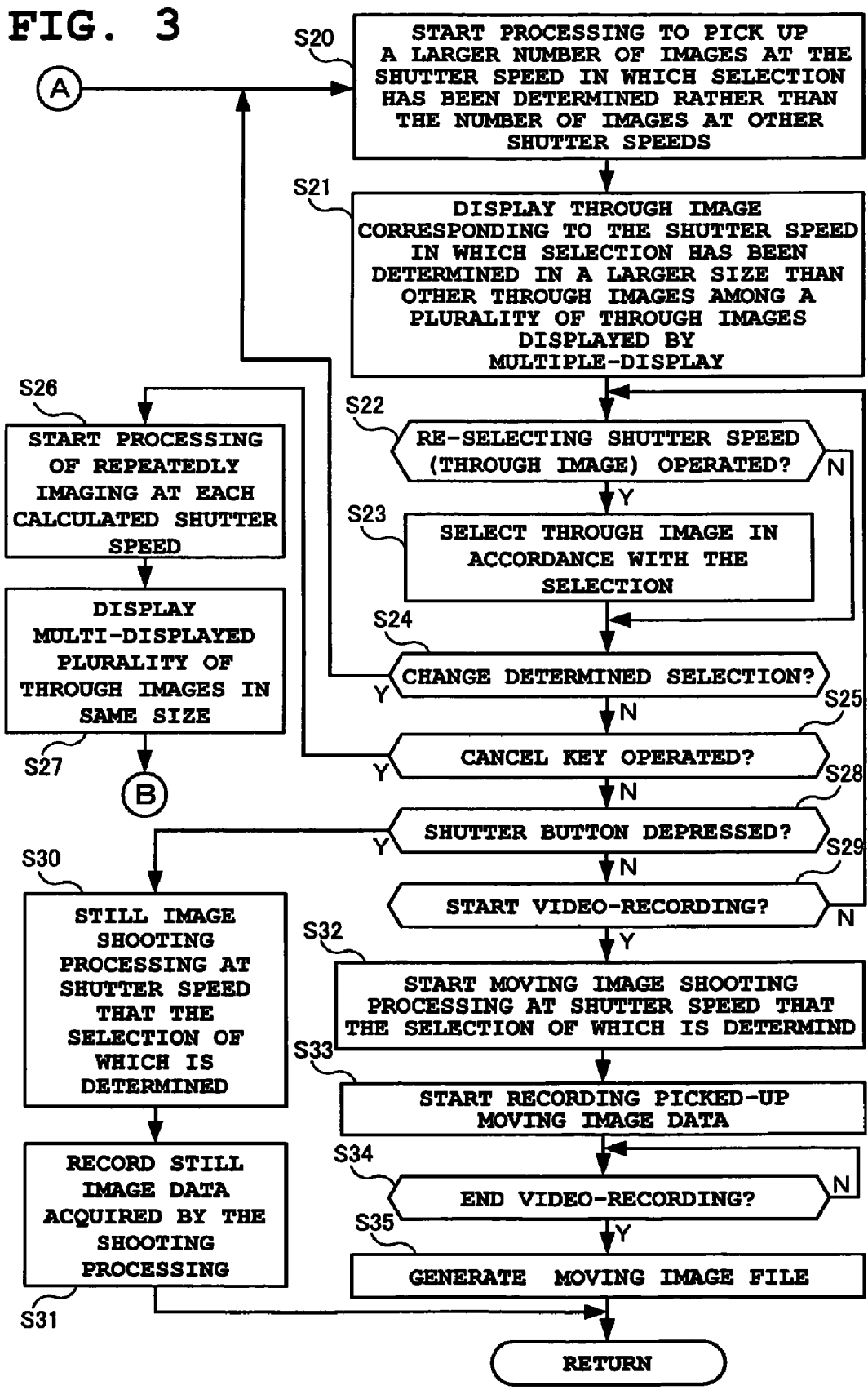
FIG. 3 is a flowchart of an operation performed by the digital camera 1 according to the embodiment.

In the meantime, when judged at Step S14 to determine selection of the shutter speed, the CPU 10 determines selection of the shutter speed that is currently selected, and proceeds to Step S20 in FIG. 3. At Step S20, the CPU 10 starts processing of imaging such that the number of images picked up at the shutter speed that the selection of which has been determined is larger than the number of images picked up at the other shutter speeds (first consecutive imaging controlling section).

Specifically, images have been so far picked up repeatedly in sequence at the individual shutter speeds as shown in FIG. 4. However, at this step, the number of images picked up which has been selected at the time of operation of the SET key (that is, selection of which has been determined) should be made larger. For example, in an image frame containing 30 frames per second, 21 frames are picked up at the shutter speed that the selection of which has been determined. Regarding the other 9 frames, 3 frames each are picked up at each of the other three shutter speeds. As a result, the number of images picked up at the shutter speed that the selection of which has been determined becomes larger. Accordingly, the through image for the shutter speed at which the user wants to shoot can be smoothly displayed. In this case, the first shutter speed has been selected.

Figure 7A:
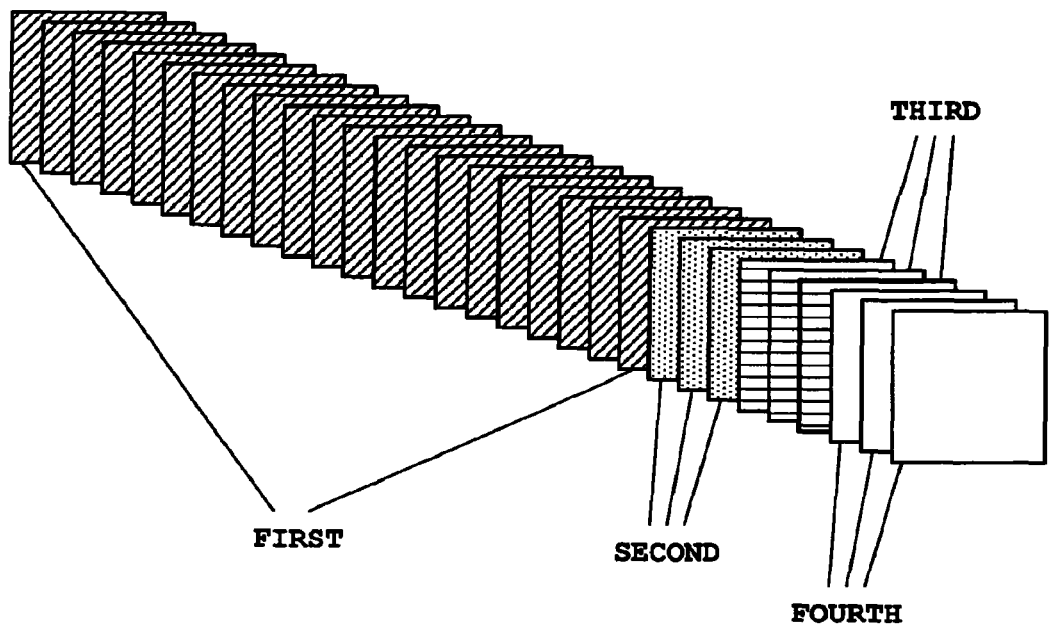
FIG. 7A and FIG. 7B are diagrams showing the shutter speeds for the frame image data that are picked up at Step S20.
Figure 7B:
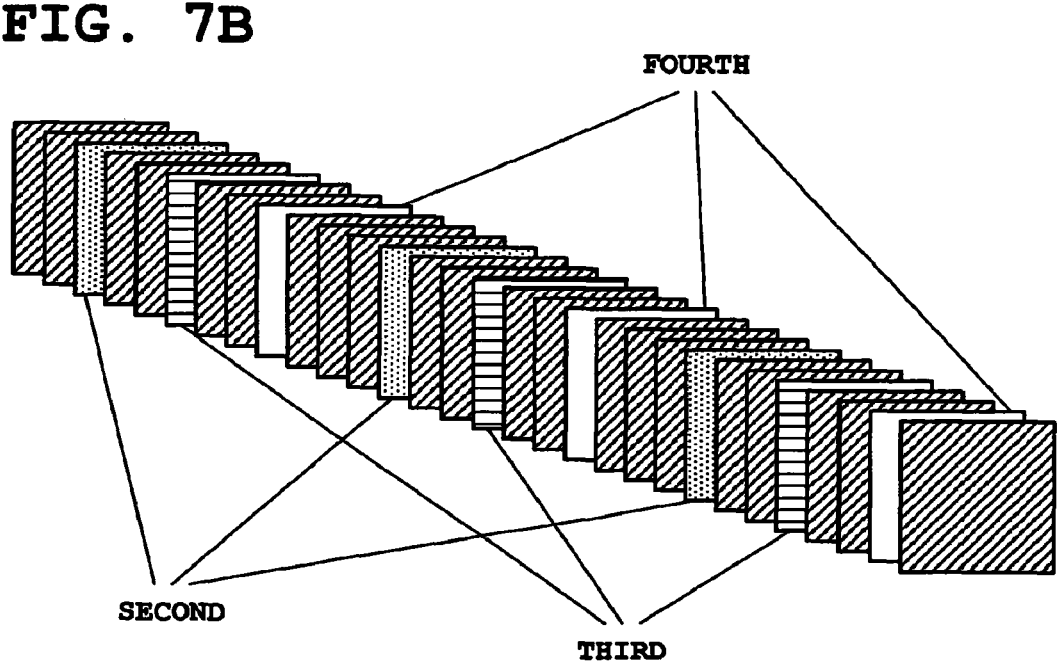

FIG. 7A and FIG. 7B are diagrams showing the shutter speeds for the frame image data that are picked up at Step S20. In this case, the shutter speed that the selection of which has been determined is the first shutter speed, and therefore, images can be picked up simply as shown in FIG. 7A, in such a manner that the frame image data equivalent to the 21 frames are consecutively picked up at the first shutter speed, and subsequently the frame image data equivalent to 3 frames are picked up at the second shutter speed, the frame image data equivalent to 3 frames are picked up at the third shutter speed, and the frame image data equivalent to 3 frames are picked up at the fourth shutter speed, sequentially. In this case, however, the frame image data that is picked up at the same shutter speed is consecutively picked up (that is, the frame image data picked up at the same shutter speed are accumulated). As a result, the through images picked up at the individual shutter speeds are fragmentary displayed. To address this, as shown in FIG. 7B, it is desirable that images be picked up at the individual shutter speeds at substantially equivalent intervals so that the through images for the individual shutter speeds are smoothly displayed.

Next, the CPU 10 proceeds to Step S21, and displays, among the multiple-displayed plurality of through images, the through image for the shutter speed that the selection of which has been determined such that the through image is displayed larger than the other through images, and also displays the through image for the shutter speed that the selection of which has been determined such that the through image is differentiated from the other through images (display controlling section).

Figure 8:
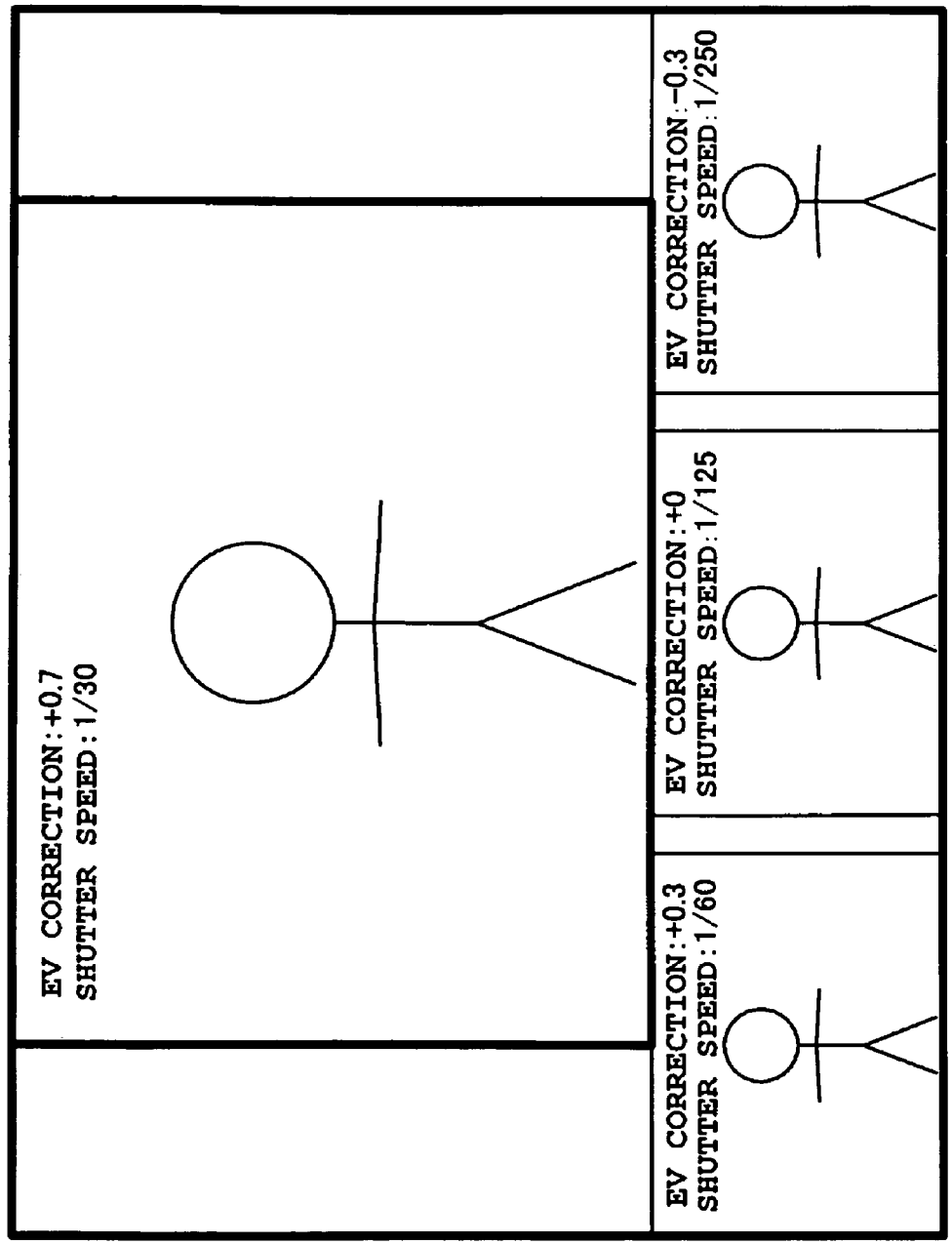
FIG. 8 is a diagram showing a state of multiple-display after selection is determined.

FIG. 8 shows the state at this step, from which it is apparent that since the first shutter speed has been determined to be selected, the through image for the first shutter speed is displayed larger than the other through images. In other words, the CPU 10 displays the through image for the shutter speed that the selection of which has been determined on the major screen, and displays the through images for the other shutter speeds on the sub-screens. In addition, it is also apparent that the through image picked up at the first shutter speed selection of which has been determined is displayed with the thick frame, and is displayed such that it is differentiated from the other through images.

As a result, the through image for the shutter speed that the selection of which has been determined is displayed larger than the through images picked up at the other shutter speeds. Therefore, the through image for the shutter speed at which the user wants to shoot (that is, at the shutter speed that the selection of which has been determined) can be displayed in an easy-to-understand manner, and it can be continuously compared with the through images for the other shutter speeds. In addition, since the number of images picked up (frame rate) at the shutter speed that the selection of which has been determined is larger (higher) than the number of images picked up (frame rate) at the other shutter speeds, the CPU 10 can display the through image for the shutter speed which the user wants to shoot (that is, at the shutter speed that the selection of which has been determined) in an easy-to-understand manner, and can continuously compare it with the through images picked up at the other shutter speeds.

Next, at Step S22, the CPU 10 judges whether operation of re-selecting the shutter speed (through image) has been selected. This judgment is made based on whether an operational signal corresponding to operation of the cross key has been sent from the key input section 14.

When judged at Step S22 that operation of re-selecting the shutter speed has been performed, the CPU 10 proceeds to Step S23 and selects the shutter speed (through image) in adherence to re-selection operation, then, proceeds to Step S24. At this time, the CPU 10 displays the through image for the shutter speed that has been newly selected such that it is differentiated from the other through images.

For example, when the user performs operation of the "→" key or the "↓" key of the cross key in the state as shown in FIG. 8 (that is, in the state where the shutter speed 1/30 is selected), the CPU 10 selects the through image corresponding to the shutter speed 1/60 and displays the selected through image with the thick frame. In the similar manner, when the user performs operation of the "→" key or the "↓" key, the CPU 10 selects the through image corresponding to the shutter speed 1/125 and displays the selected through image with the thick frame.

As a result, the user performs re-selection of the shutter speed at which the user wants to shoot even in the multiple-displayed state in which the shutter speed that the selection of which has been determined is displayed larger.

On the other hand, when judged at Step S22 that re-selection of the shutter speed has not been performed, the CPU 10 proceeds to Step S24 without executing any processing.

At Step S24, the CPU 10 judges whether to change the shutter speed that the selection of which is currently determined. First, the CPU 10 judges it based on whether an operational signal corresponding to operation of the SET key has been sent from the key input section 14. Next, if the operational signal corresponding to operation of the SET key has been sent, the CPU 10 judges whether the through image for the shutter speed selection of which has not been determined is selected (that is, whether the through image displayed on the sub screen is selected). When judged that the operational signal corresponding to operation of the SET key has been sent, and when judged, if the operational signal corresponding to operation of the SET key has been sent, that the through image displayed on the sub screen is selected, the CPU 10 judges to change the shutter speed that the selection of which is determined.

When judged at Step S24 to change determined selection of the shutter speed, the CPU 10 changes the shutter speed that the selection of which has been determined to the through image for the shutter speed displayed on the sub screen that is currently selected. Then, the CPU 10 returns to Step S20. As a result, the CPU 10 can address even the case where the user wants to shoot at a shutter speed other than the shutter speed selection of which has been determined.

On the other hand, when judged at Step S24 not to change determined selection of the shutter speed, the CPU 10 proceeds to Step S25, and judges whether operation of the cancellation key has been performed. This judgment is made based on whether an operational signal corresponding to operation of the cancellation key has been sent from the key input section 14.

When judged at Step S25 that operation of the cancellation key has been performed, the CPU 10 proceeds to Step S26, where the CPU 10, as shown in FIG. 4, starts processing of repeatedly picking up images in sequence at the individual shutter speeds (first consecutive imaging controlling section).

Next, at Step S27, the CPU 10 starts processing of displaying a plurality of multi-displayed through images in the same size as shown in FIG. 6 (display controlling section), and returns to Step 10 in FIG. 2. At this time, the first shutter speed can be selected and displayed such that it is differentiated from the others. Alternatively, the shutter speed selected immediately before or the shutter speed that the selection of which has been determined immediately before can be displayed such that it is differentiated.

As a result, the CPU 10 can also change selection of the shutter speed that the selection of which is determined.

On the other hand, when judged at Step S25 that operation of the cancellation key has not been performed, the CPU 10 proceeds to Step S28, and judges whether the shutter button has been depressed. As a result, the user can instruct the shooting timing of the still image.

When judged at Step S28 that the shutter button has not been depressed, the CPU 10 proceeds to Step S29, and judges whether to start video-recording. As a result, the user can instruct the shooting timing of the moving image.

When judged at Step S29 not to start video-recording, the CPU 10 returns to Step S22, and repeats the operations as described above.

On the other hand, when judged at Step S28 that the shutter button has been depressed, the CPU 10 proceeds to Step S30, and performs still image shooting processing at the shutter speed that the selection of which is currently determined (at the shutter speed for the through image that is displayed larger than the other through images) (still image imaging controlling section). As a result, the still image data for the shutter speed that the user desires can be acquired.

Next, at Step S31, the CPU 10 compresses the still image data acquired by the shooting processing, generates the still image file, and records it in the flash memory 13 (recording controlling section).

In the meantime, when judged at Step S29 to start video-recording, the CPU 10 proceeds to Step S32, and starts the moving image imaging processing at the shutter speed that the selection of which is currently determined (second consecutive imaging controlling section). As a result, the moving image data for the shutter speed that the user desires can be acquired.

Next, at Step S33, the CPU 10 starts processing of recording the picked-up moving image data in the flash memory 13. In other words, the CPU 10 records the frame image data that is consecutively picked up by the moving image imaging processing in the flash memory 13 (recording controlling section).

Next, at Step S34, the CPU 10 judges whether to end video-recording. When judged at Step S34 not to end video-recording, the CPU 10 remains at Step S34 until it judges to end video-recording. When judged at Step S35 to end video-recording, the CPU 10 proceeds to Step S35, and generates the moving image file from the recorded moving image data for the shutter speed that the selection of which has been determined.

As described above, in the embodiment, the CPU 10 picks up images of the subject at the shutter speeds that correspond to the plurality of EV shift values selected by the user, sort the frame image data acquired by imaging by shutter speed, and generate the moving image data. Therefore, the CPU 20 can generate concurrently a plurality of moving images picked up in different shooting conditions (e.g., the shutter speeds) without depending on image treatment or image processing.

In addition, the plurality of generated moving image data (moving image data for the individual shutter speeds) are multiple-displayed as a through image. Therefore, the user can compare the through images for the individual EV shift values (shutter speeds) while recognizing the subject in real time, and can select the EV shift value (shutter speed) that the user desires.

In addition, in the case where the through images for the individual shutter speeds are multiple-displayed in the same size, the images are picked up repeatedly in sequence at the individual shutter speeds. Therefore, the through images for the individual shutter speeds can be displayed with the equal image quality (at the equal frame rate).

In addition, when the shutter button is depressed while the through images for the individual shutter speeds are multiple-displayed in the same size (before selection is determined), the CPU 10 consecutively picks up the image of the subject once at the individual shutter speeds for which the through image is displayed, and records the picked-up image data for the individual shutter speeds as the still image. Therefore, the still images for the individual shutter speeds can be acquired.

In addition, if the recording button is depressed while the through images for the individual shutter speeds are multiple-displayed in the same size (before selection is determined), the CPU 10 records the moving image data which is generated after the recording button has been depressed. Therefore, the moving image data corresponding to the individual shutter speeds can be acquired, and the individual moving image data with the equal image quality can be acquired.

In addition, selection of the through image for the shutter speed at which the user wants to shoot can be determined while the through images for the individual shutter speeds are multiple-displayed in the same size. Therefore, selection of the shutter speed at which the user wants to shoot can be determined.

In addition, when selection of the shutter speed is determined, the CPU 10 displays the through image for the shutter speed that the selection of which has been determined larger than the other through images. Therefore, the through image for the selected shutter speed can be displayed in an easy-to-understand manner, and can be continuously compared with the through images for the other shutter speeds.

In addition, when selection of the shutter speed is determined, the number of images picked up at the shutter speed (frame rate) that the selection of which has been determined is larger (higher) than the number of images picked up at the other shutter speeds (frame rate). Therefore, the through image for the shutter speed that the selection of which has been determined can be smoothly displayed, and can be continuously compared with the through images for the other shutter speeds.

In addition, the shutter speed that the selection of which has been determined can be changed even when the through image for the shutter speed that the selection of which has been determined is displayed larger than the other through images. Therefore, the shutter speed can be changed to the shutter speed at which the user wants to shoot.

In addition, even when the through image for the shutter speed that the selection of which has been determined is displayed larger than the other through images, the CPU 10 can cancel selection determination of the shutter speed by operation of the cancellation key, and can return the state to a state where selection is not determined (that is, in the state where the through images for the individual shutter speeds are displayed in the same size and images are being picked up repeatedly in sequence at the individual shutter speeds). Also, selection of the shutter speed or the like can be determined again.

In addition, when the shutter button is depressed in the state where the through image for the shutter speed that the selection of which has been determined is displayed larger than the other through images, the still image is shot at the shutter speed that the selection of which has been determined. Therefore, the image data shot at the shutter speed that the selection of which has been determined can be acquired.

In addition, when the recording button is depressed in the state where the through image for the shutter speed that the selection of which has been determined is displayed larger than the other through images, images are consecutively picked up at the shutter speed that the selection of which has been determined, and the acquired frame image data is recorded as the moving image data. Therefore, the moving image data picked up at the shutter speed that the selection of which has been determined can be acquired.

C. Variation Examples

The following variation examples of the embodiment as described above are possible.

(1) According to the embodiment as described above, a user arbitrarily selects a plurality of EV shift values, and the CPU 10 picks up images of the subject consecutively at the shutter speeds corresponding to the selected EV shift values. Instead, the user may arbitrarily select a plurality of different sensitivities, and the CPU 10 may pick up images of the subject consecutively at the shutter speeds corresponding to the individual selected sensitivities.

Alternatively, the user may directly select a plurality of shutter speeds, and the CPU 10 may consecutively pick up images of the subject at the selected individual shutter speeds.

In other words, any method is possible as long as the method is capable of consecutive imaging at different shutter speeds.

(2) In addition, according to the embodiment as described above, the shutter speed is used to describe the shooting condition independent of image treatment or image processing (independent image processing shooting condition). In place of the shutter speed, an aperture or light emission time of a flash lamp (light emission quantity) may be used. Basically, any method is applicable as long as it makes shooting conditions different using a method other than image treatment or image processing.

As a result, a plurality of moving images corresponding to different shooting conditions (such as, shutter speeds) can be concurrently generated without using image treatment or image processing.

(3) In addition, according to the embodiment as described above, multiple-display as shown in FIG. 6 is performed initially, and then when selection of a through image at any shutter speed is selected, multiple-display as shown in FIG. 8 is performed. However, the multiple-display as shown in FIG. 8 may only be initially performed. Alternatively, multiple-display as shown in FIG. 6 may only be performed.

Specifically, in a case where multiple-display as shown in FIG. 8 is performed, when the CPU 10 calculates the shutter speed at Step S6 in FIG. 2, the CPU 10 may proceed to Step S20 in FIG. 3. At Step S20, the CPU 10 may pick up a larger number of images at the shutter speed that the selection of which has been determined than the other shutter speeds, sort the picked-up frame image data by shutter speed to generate the moving image data corresponding to the individual shutter speeds, and proceed to Step S21.

In some cases, the "shutter speed that the selection of which has been determined" has not been selected by the user initially. In this case, the CPU 10 automatically selects and determines an arbitrary shutter speed.

Next, in the case where only multiple-display as shown in FIG. 6 is performed, when selection of the shutter speed is determined at Step S14 in FIG. 2, the CPU 10 proceeds to Step S20. At Step S20, the CPU 10 picks up a larger number of images at the shutter speed that the selection of which has been determined than the other shutter speeds, and by skipping Step S21, displays the moving image data that has been sorted out by shutter speed in the through image in the same size. At this time, the CPU 10 performs identification display so that the user can recognize the through image for the shutter speed that the selection of which has been determined, the through image that is currently selected and the other through images by seeing them.

(4) In addition, according to the embodiment as described above, when selection of the shutter speed is determined at Step S14 in FIG. 2, the CPU 10 should proceed to Step 20 in FIG. 3, where the CPU 10 picks up a larger number of images at the shutter speed that the selection of which has been determined than the other shutter speeds. However, even after the selection is determined, in the similar manner as Step S7 in FIG. 2, processing of repeatedly picking up in sequence at the individual shutter speeds may be continued. In other words, even if selection is determined, the frame rate for the through image for the shutter speed that the selection of which has been determined is the same as the frame rate for the through image for the shutter speed that the selection of which has not been determined.

(5) In addition, according to the embodiment as described above, when the CPU 10 judges at Step S29 in FIG. 3 to start video-recording, the CPU 10 performs the moving image imaging processing at the selected shutter speed. However, the CPU 10 may continue imaging processing at Step S20 without executing any processing (in other words, continue processing of picking up a larger number of images at the shutter speed that the selection of which has been determined than the number of images picked up at the other shutter speeds), and record the moving image data that have been sorted out by shutter speed. In other words, even if the CPU 10 judges to start video-recording, the CPU 10 may continue imaging processing as shown in FIG. 7B, and record the moving image data that have been sorted out by shutter speed. In this case, the frame rate of the movie for the shutter speed that the selection of which has been determined is different from the frame rate for the other shutter speeds, and the shutter speed that the selection of which has been determined has a higher frame rate.

As a result, the moving image data for the individual shutter speeds can be acquired, and an image quality of moving image data corresponding to the shutter speed that the selection of which has been determined can be improved.

(6) In addition, according to the embodiment as described above, selection can be determined only for one shutter speed. Instead, selection of two or more shutter speeds can be determined. Note that the number of the shutter speeds of which selection can be determined need be smaller than the number of the shutter speeds that are calculated at Step S6 (that is, the EV shift values determined at Step S5).

In this case also, the through image for the shutter speed that the selection of which has been determined is displayed on the major screen, and the through images for the other shutter speeds are displayed on the sub-screens. However, 2 or more through images are displayed on the major screen.

In this case, when the shutter button is depressed (Y at Step S28 in FIG. 3), the CPU 10 performs still image shooting consecutively at the 2 or more shutter speeds that the selection of which has been determined (consecutive still image imaging controlling section), and record the still image data that has been shot at the individual shutter speeds that the selection of which has been determined. When instruction of video-recording is given by depression of the recording button (Y at Step S29 in FIG. 3), the CPU 10 repeatedly picks up images of the subject consecutively at the 2 or more shutter speeds that the selection of which has been determined (third consecutive imaging controlling section), sorts the picked-up frame image by shutter speed so as to generate the moving image data corresponding to the individual shutter speeds, and records the moving image data for the individual shutter speeds that the selection of which has been determined.

In addition, priority may be established among the shutter speeds that the selection of which has been determined and the numbers of images picked up may differ depending on the priority. For example, the number of images picked up at the shutter speed of the highest priority is the largest, and the number of images picked up at the shutter speed of the second highest priority is the second largest.

As a result, the still image data and the moving image data at a plurality of shutter speeds that the user desires can be acquired concurrently.

(7) In addition, according to the embodiment as described above, images are picked up repeatedly in sequence at the individual shutter speeds at Step S7 (see FIG. 4), and a larger number of images are picked up at the shutter speed selection of which has been determined than the number of images picked up at the other shutter speeds at Step S20 (see FIG. 7B). However, the present invention is not limited to this. Basically, any apparatus or method is possible as long as it performs consecutive imaging that includes imaging in all calculated shooting conditions achieved by, while picking up images at one shutter speed of the plurality of the shutter speeds calculated at Step S6, alternately interposing imaging at the other calculated shutter speeds.

For example, assume the case where four shutter speeds are calculated: the shutter speed 1, the shutter speed 2, the shutter speed 3 and the shutter speed 4. Any is acceptable as long as imaging of at least one of the shutter speeds at the shutter speed 2, at the shutter speed 3, or at the shutter speed 4 is interposed between imaging at the shutter speed 1 and imaging at the shutter speed 1. Alternatively, any is acceptable as long as imaging of at least one of the shutter speeds at the shutter speed 1, at the shutter speed 3, or at the shutter speed 4 is interposed between imaging at the shutter speed 2 and imaging at the shutter speed 2. Basically, any appliance or method is acceptable as long as it performs consecutive imaging including all calculated shooting conditions achieved by applying imaging operation of interposing imaging at the other calculated shutter speeds while performing imaging at one shutter speed to a plurality of number of imaging at all calculated shutter speeds.

Therefore, the embodiment may be modified so that consecutive imaging is performed such that all or a part of the moving image data for the individual shutter speeds differ from each other.

(8) In addition, according to the embodiment as described above, at Step S7 in FIG. 2, the CPU 10 repeatedly picks up images in sequence at the individual shutter speeds. Therefore, in the case where images of the subject are picked up at a predetermined frame rate S, the frame rates for the through images for the individual shutter speeds equal "the predetermined frame rate/the number of shutter speeds" which are reduced significantly from the predetermined frame rate.

Accordingly, the frame rate at which images are picked up may be increased in adherence to the number of the EV shift values (number of the shutter speeds) selected by the user. For example, if the number of the selected EV shift values is 4 in the case where images are picked up at a predetermined frame rate S, the frame rate at which images are picked up may be 4×S. As a result, the frame rates for the through images for the individual shutter speeds may be set to a predetermined frame rate S.

The individual shutter speeds in this case should be faster than the frame rate of 4×S at which images are picked up.

(9) In addition, the present invention may have a mode created by arbitrarily combining the above variation examples (1) to (8).

(10) The embodiment and variation example thereof as described above of the present invention are merely examples as a best mode for carrying out the invention, and aim to facilitate understanding of the principle and structure of the present invention. It is not intended to limit the scope of the accompanying claims.

Therefore, it should be construed that various variations and modification for the above-described embodiment of the present invention be included in the scope of the present invention and protected by the scope of the accompanying claim of the present invention.

Lastly, according to the embodiment as described above, a case where an imaging apparatus of the present invention is applied to the digital camera 1 is described. However, the present invention is not limited to the above-described embodiment. In other words, the present invention may be applied to any equipment as long as it can pick up an image of the subject.

While the present invention has been described with reference to the preferred embodiments, it is intended that the invention be not limited by any of the details of the description therein but includes all the embodiments which fall within the scope of the appended claims.

What is claimed is:

1. An imaging apparatus comprising:
   an imaging section for imaging a subject;
   a first imaging controlling section for controlling the imaging section to repeatedly perform imaging in a first exposure condition;
   a second imaging controlling section for controlling the imaging section to repeatedly perform imaging in a second exposure condition that is different from the first exposure condition such that the imaging in the second exposure condition repeatedly interposes the imaging in the first exposure condition which is repeatedly performed by the first imaging controlling section;
   a first generation section for generating a first moving image data based on a plurality of frame image data acquired by repeated imaging performed by the first imaging controlling section;
   a second generation section for generating a second moving image data based on a plurality of frame image data acquired by repeated imaging performed by the second imaging controlling section; and
   a selection section for selecting one of the exposure conditions from the first exposure condition and the second exposure condition;
   wherein the first imaging controlling section controls the imaging section to repeatedly perform imaging in the first exposure condition at a frequency higher than a frequency of imaging repeatedly performed by the second imaging controlling section in the second exposure condition, when the first exposure condition is selected by the selection section, and the second imaging controlling section controls the imaging section to repeatedly perform imaging in the second exposure condition at a frequency higher than a frequency of imaging repeatedly performed by the first imaging controlling section in the first exposure condition, when the second exposure condition is selected by the selection section.

2. The imaging apparatus according to claim 1, wherein the exposure condition is an exposure time.

3. The imaging apparatus according to claim 1, wherein the exposure condition is an aperture value.

4. The imaging apparatus according to claim 1, further comprising:
   a display section for displaying an image; and
   a display controlling section for controlling the display section to simultaneously display the first moving image data generated by the first generation section and the second moving image data generated by the second generation section.

5. The imaging apparatus according to claim 4, wherein the display controlling section controls the display section to simultaneously display the first moving image data and the second moving image data in the same size.

6. The imaging apparatus according to claim 4, wherein the display controlling section controls the display section to simultaneously display the first moving image data and the second moving image data such that one of the moving image data is displayed in a larger size than the other moving image data.

7. The imaging apparatus according to claim 6, wherein the selection section is adapted to select one of the moving image data from the first moving image data and the second moving image data; and
   wherein the display controlling section controls the display section to simultaneously display the moving image data selected by the selection section in a larger size than the other moving image data.

8. The imaging apparatus according to claim 1, further comprising:
   a display section for displaying an image; and
   a display controlling section for controlling the display section to simultaneously display the first moving image data generated by the first generation section and the second moving image data generated by the second generation section;
   wherein the selection section selects the exposure condition through selection of one of the moving image data from the first moving data and the second moving image data that are displayed by the display controlling section in the display section.

9. The imaging apparatus according to claim 1, further comprising:
   a recording section for recording moving image data; and
   a recording controlling section for controlling the recording section to record the first moving image data generated by the first generation section and the second moving image data generated by the second generation section.

10. The imaging apparatus according to claim 1, further comprising:
    a recording section for recording still image data;
    a consecutive still image imaging controlling section for controlling the imaging section to consecutively perform still image imaging in the first exposure condition and still image imaging in the second exposure condition; and
    a recording controlling section for controlling the recording section to record the still image data acquired by still image imaging performed by the consecutive still image imaging controlling section.

11. An imaging method comprising:
    a first imaging controlling step for controlling an imaging section to repeatedly perform imaging in a first exposure condition;
    a second imaging controlling step for controlling the imaging section to repeatedly perform imaging in a second exposure condition that is different from the first exposure condition such that the imaging in the second exposure condition repeatedly interposes the imaging in the first exposure condition which is repeatedly performed by the first imaging controlling step;

a first generation step for generating a first moving image data based on a plurality of frame image data acquired by repeated imaging performed by the first imaging controlling step;

a second generation step for generating a second moving image data based on a plurality of frame image data acquired by repeated imaging performed by the second imaging controlling; step; and a selection step for selecting one of the exposure conditions from the first exposure condition and the second exposure condition;

wherein when the first exposure condition is selected by the selection step, the first imaging controlling step is performed so as to control the imaging section to repeatedly perform imaging in the first exposure condition at a frequency higher than a frequency of imaging repeatedly performed in the second exposure condition by the second imaging controlling step, and when the second exposure condition is selected by the selection step, the second imaging controlling step is performed so as to control the imaging section to repeatedly perform imaging in the second exposure condition at a frequency higher than a frequency of imaging repeatedly performed in the first exposure condition by the first imaging controlling step.

12. A non-transitory computer-readable storage medium having a program for an imaging apparatus stored thereon that is executable by a computer to perform processes comprising:

a first imaging controlling process for controlling an imaging section to repeatedly perform imaging in a first exposure condition;

a second imaging controlling process for controlling the imaging section to repeatedly perform imaging in a second exposure condition that is different from the first exposure condition such that the imaging in the second exposure condition repeatedly interposes the imaging in the first exposure condition which is repeatedly performed by the first imaging controlling process;

a first generation process for generating a first moving image data based on a plurality of frame image data acquired by repeated imaging performed by the first imaging controlling process;

a second generation process for generating a second moving image data based on a plurality of frame image data acquired by repeated imaging performed by the second imaging controlling process; and a selection process for selecting one of the exposure conditions from the first exposure condition and the second exposure condition;

wherein when the first exposure condition is selected by the selection process, the first imaging controlling process is performed so as to control the imaging section to repeatedly perform imaging in the first exposure condition at a frequency higher than a frequency of imaging repeatedly performed in the second exposure condition by the second imaging controlling process, and when the second exposure condition is selected by the selection process, the second imaging controlling process is performed so as to control the imaging section to repeatedly perform imaging in the second exposure condition at a frequency higher than a frequency of imaging repeatedly performed in the first exposure condition by the first imaging controlling process.

* * * * *